United States Patent
Wang et al.

(10) Patent No.: US 9,258,816 B2
(45) Date of Patent: Feb. 9, 2016

(54) METHOD AND APPARATUS FOR NOTIFYING A SUBFRAME CONFIGURATION OF MULTICAST BROADCAST SINGLE FREQUENCY NETWORK

(75) Inventors: Ying Wang, Beijing (CN); Jiayi Fang, Beijing (CN); Xiaodong Yang, Beijing (CN)

(73) Assignee: CHINA ACADEMY OF TELECOMMUNICATIONS TECHNOLOGY (CN)

( * ) Notice: Subject to any disclaimer, the term of this patent is extended or adjusted under 35 U.S.C. 154(b) by 1091 days.

(21) Appl. No.: 13/266,010

(22) PCT Filed: Apr. 16, 2010

(86) PCT No.: PCT/CN2010/071840
§ 371 (c)(1),
(2), (4) Date: Jan. 11, 2012

(87) PCT Pub. No.: WO2010/121527
PCT Pub. Date: Oct. 28, 2010

(65) Prior Publication Data
US 2012/0099505 A1    Apr. 26, 2012

(30) Foreign Application Priority Data
Apr. 24, 2009   (CN) .......................... 2009 1 0082696

(51) Int. Cl.
H04H 20/71   (2008.01)
H04W 72/04   (2009.01)
H04W 72/00   (2009.01)

(52) U.S. Cl.
CPC ........ *H04W 72/0426* (2013.01); *H04W 72/005* (2013.01)

(58) Field of Classification Search
CPC ........... H04W 4/06; H04J 3/14; H04Q 11/045
See application file for complete search history.

(56) References Cited

U.S. PATENT DOCUMENTS

2008/0167003 A1*   7/2008   Wang et al. ............... 455/411
2009/0156225 A1*   6/2009   Angelow et al. ........... 455/450

FOREIGN PATENT DOCUMENTS

| CN | 101184076 | 5/2008 |
| WO | WO 2008/118064 | 10/2008 |
| WO | WO 2008/127185 | 10/2008 |

OTHER PUBLICATIONS

International Search Report from corresponding application No. PCT/CN2010/071840.

* cited by examiner

*Primary Examiner* — Lonnie Sweet
(74) *Attorney, Agent, or Firm* — Hauptman Ham, LLP

(57) ABSTRACT

The present invention provides a method for notifying Multicast Broadcast Single Frequency Network (MBSFN) subframe configuration, which comprises the following steps: a first node sends its MBSFN subframe configuration, via an X2 interface, to a second node with which the first node is connected; the first node receives the MBSFN subframe configuration of the second node as a feedback. According to the invention, a serving cell can obtain the MBSFN subframe configurations of the neighboring cells and/or RNs, so that rational utilization of resources is achieved according to the configurations. Therefore, interference between cells is reduced, and system capacity and efficiency are improved.

15 Claims, 5 Drawing Sheets

METHOD AND APPARATUS FOR NOTIFYING A SUBFRAME CONFIGURATION OF MULTICAST BROADCAST SINGLE FREQUENCY NETWORK

RELATED APPLICATIONS

The present application is a National Phase of International Application Number PCT/CN2010/071840, filed Apr. 16, 2010 and claims priority from, Chinese Application Number 200910082696.6, filed Apr. 24, 2009.

FIELD OF THE INVENTION

The invention relates to a communication technology, in particular to a method and apparatus for notifying a subframe configuration of Multicast Broadcast Single Frequency Network (MBSFN).

BACKGROUND OF THE INVENTION

In a current Long Term Evolution (LTE) system, frame structures of both Frequency Division Duplex (FDD) and Time Division Duplex (TDD) have the length of 1 ms, respectively. FIG. 1 shows the frame structure of LTE-TDD according to the prior art, wherein a half-frame of respective TDD radio frame consists of five subframes, respective of which has the length of 1 ms and contains two slots of 0.5 ms.

With increasing lack of frequency resources, more and more attentions are paid to Single Frequency Network (SFN) both in the field of digital television terrestrial broadcasting or in mobile communication technology. Basing on the SFN, several transmitters of a certain geographic region transmit identical signals on the same frequency band simultaneously to realize a reliable coverage of this region. In the SFN realized in Multimedia Broadcast and Multicast Service (MBMS), several base stations transmit identical signals with the same frequency simultaneously. The distribution of Multicast Broadcast Single Frequency Network (MBSFN) is classified as: Radio Frame and Sub Frame.

The disadvantages of the prior art are: when the radii of neighboring cells change according to requirements of coverage, the MBSFN subframe configurations of the neighboring cells may be different from that of the eNB, as an eNB fails to obtain the subframe configurations of the MBSFN in the neighboring cells. Therefore, interference between the neighboring cells and the base station occurs, and system capacity and service quality are influenced. In addition, the eNB fails to obtain the subframe configurations of the MBSFN in the neighboring cells and notify a User Equipment (UE) of it, thereby measurements for the cell will be influenced.

SUMMARY OF THE INVENTION

Owing to the above, the object of the present invention is to solve at least one of the above technical defects, in particular to solve the defect of the prior art that the eNB fails to obtain the subframe configurations of the MBSFN in the neighboring cells.

In order to achieve this object, one aspect of the present invention proposes a method for notifying MBSFN subframe configurations, which comprises the following steps: a first node sends its MBSFN subframe configuration, via an X2 interface, to a second node with which the first node is connected; the first node receives MBSFN subframe configurations of the second nodes fed back by them.

The present invention also proposes an apparatus for notifying MBSFN subframe configurations, which comprises a sending module and a receiving module, wherein the sending module is configured for sending the MBSFN subframe configuration of an eNB, via an X2 interface, to respective neighboring cells and/or RNs, and the receiving module is configured for receiving the MBSFN subframe configurations of the respective neighboring cells as a feedback.

The present invention also proposes an apparatus for notifying MBSFN subframe configurations, which comprises a receiving module and a feedback module, wherein the receiving module is configured for receiving the MBSFN subframe configurations from a plurality of first nodes; the feedback module is configured for feeding the MBSFN subframe configuration of the second node back to respective first nodes.

According to the invention, a serving cell can obtain the MBSFN subframe configurations of the neighboring cells and/or RNs, so that rational utilization of resources is achieved according to the configurations. Therefore, interference between cells is reduced, and system capacity and efficiency are improved.

Other aspects and advantages of the present invention will be illustrated in the following description and part of them will become apparent through the following description or be understood through the embodiments of the present invention.

BRIEF DESCRIPTION OF THE DRAWINGS

The above and/or additional aspects and advantages of the present invention will become apparent and easily understood from the following description of the embodiments in conjunction with the accompanying drawings, in which.

DETAILED DESCRIPTION OF THE PRESENT INVENTION

Hereafter, the embodiments of the present invention will be illustrated in detail, and the examples of the embodiments are shown in figures, wherein identical or similar reference numbers designate an identical or similar element or elements having identical or similar functions throughout. The following embodiments described with reference to the figures are merely exemplary and are only used to illustrate the present invention rather than being construed as limiting the present invention.

The present invention enables eNB (or RN) to obtain the MBSFN subframe configurations of neighboring cells and/or RNs (or eNBs) with interaction between them, and rational utilization of resources is achieved according to the configurations, thereby interference between cells is reduced, and system capacity and efficiency are improved.

Figure 1:
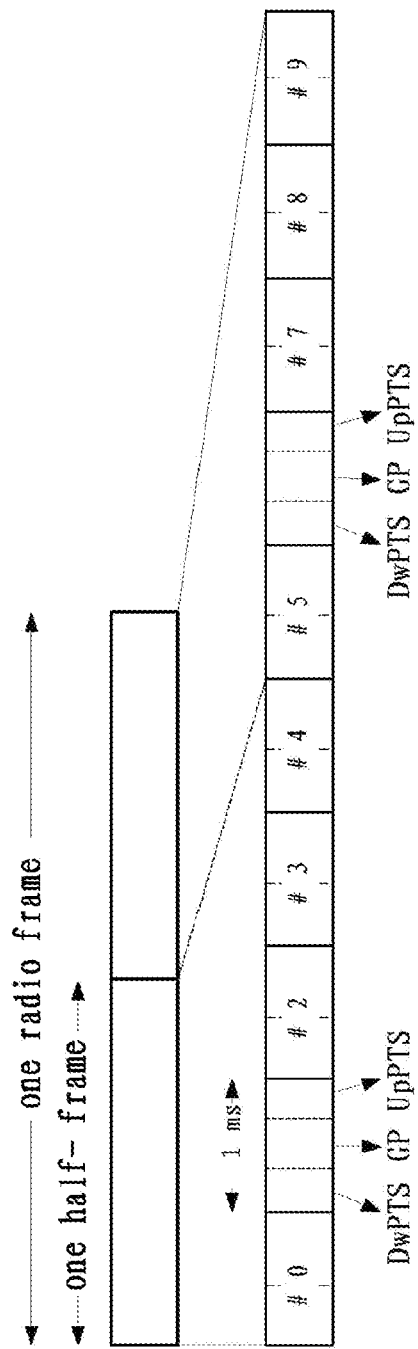
FIG. 1 is a diagram showing a frame structure of LTE-TDD in the prior art.
Figure 2:
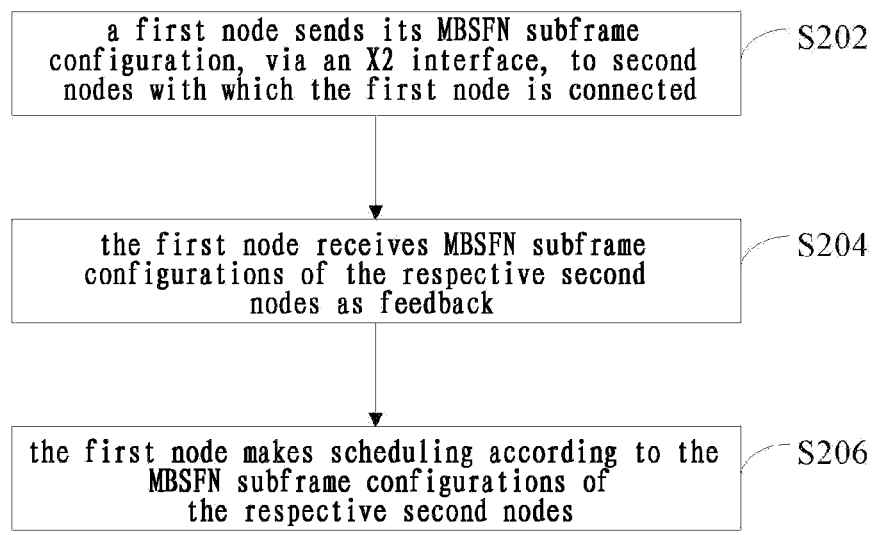
FIG. 2 is a flowchart showing a method for notifying MBSFN subframe configurations according to an embodiment of the present invention.

FIG. 2 is a flowchart showing a method for notifying MBSFN subframe configurations according to an embodiment of the present invention. As shown in FIG. 2, the method comprises the following steps:

S202: a first node sends its MBSFN subframe configuration, via an X2 interface, to a second node with which the first node is connected;

S204: the first node receives MBSFN subframe configurations of the second nodes fed back by respective second nodes;

S206: the first node makes scheduling according to the MBSFN subframe configurations of respective second nodes, while the second node may also make scheduling according to the MBSFN subframe configuration of the first node.

When a cell is set up, the step of the first node sending its MBSFN subframe configuration to respective second nodes via an X2 interface comprises: the first node sends its MBSFN subframe configuration to respective second nodes with X2 setup request messages.

The step of the first node receiving the feedback MBSFN subframe configurations of respective second nodes comprises: the first node receives the MBSFN subframe configurations of respective second nodes feedback by X2 setup response messages.

After the first node receives the feedback MBSFN subframe configurations of respective second nodes, the method also comprises: the first node compares the MBSFN subframe configurations of respective second nodes with the MBSFN subframe configuration of the first node, and sets system information or radio resource control RRC connection reconfiguration information according to a comparison result.

After the second node receives the sent MBSFN subframe configuration of the first node, the method also comprises: the second nodes compare the MBSFN subframe configuration of the first node with the MBSFN subframe configurations of the second nodes, and set system information or radio resource control RRC connection reconfiguration information according to a comparison result.

When the MBSFN subframe configuration of the first node changes, the step of the first node sending its MBSFN subframe configuration to respective second nodes via the X2 interface comprises: the first node sends its MBSFN subframe configuration to the respective second nodes with the X2 configuration update message of the first node. Similarly, when the MBSFN subframe configurations of the second nodes change, the second nodes send their MBSFN subframe configurations to the first node with the X2 configuration update messages of the second nodes.

The first node may be an eNB or a RN, and the second nodes may be neighboring eNBs or RNs.

Figure 3:
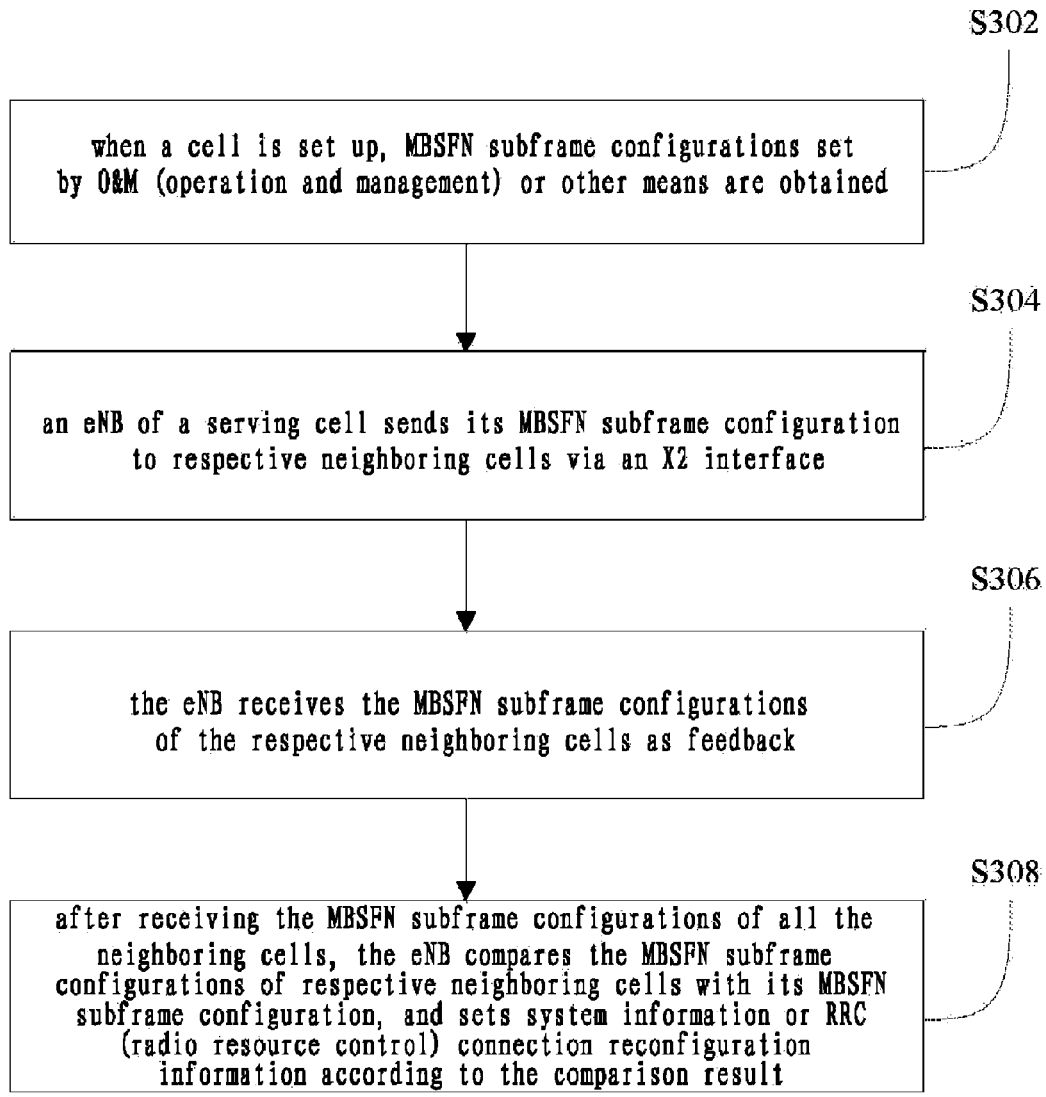
FIG. 3 is a detailed flowchart showing the method for notifying MBSFN subframe configurations according to the embodiment of the present invention.

FIG. 3 is a flowchart showing the method for notifying MBSFN subframe configurations according to an embodiment of the present invention. In this embodiment, interaction of the MBSFN subframe configurations between the eNB of the serving cell and the neighboring cells is described as an example. However, it should be explained that the present invention is not limited to this embodiment. The interaction of the MBSFN subframe configurations between the eNB and RN as well as between RN and RN may also be implemented with reference to this embodiment. This embodiment comprises the following steps:

S302: when a cell is set up, MBSFN subframe configurations are set by O&M (operation and management) or other means.

S304: an eNB of a serving cell sends its MBSFN subframe configuration to respective neighboring cells via an X2 interface.

Particularly, in one embodiment of the present invention, the eNB sends its MBSFN subframe configuration to respective neighboring cells with X2 setup request messages. More particularly, the eNB adds the MBSFN subframe configuration into serving cell information and sends it to respective neighboring cells with X2 setup request messages. The serving cell information is shown in the following table:

| Information type | Information description |
|---|---|
| Physical layer ID | Physical layer ID of cells |
| Cell ID | Cell ID, |
| Tracking area code | Tracking area code |
| PLMN of broadcasting | information of all providers' network shared by the cell |
| >PLMN ID | providers' network ID |
| Frequency point | Central working frequency of the cell |
| Uplink transmission bandwidth | Uplink transmission bandwidth of the cell |
| Downlink transmission bandwidth | Downlink transmission bandwidth of the cell |
| Subframe distribution | TDD downlink and uplink subframe configuration |
| Special subframe distribution | Special subframe distribution |
| MBSFN subframe distribution | MBSFN subframe distribution |

It should be explained that the eNB may send its subframe configuration to the neighboring cells with other methods, and it is not limited to adding its subframe configuration into the serving cell information, which is only an exemplary embodiment for realizing the present invention rather than limiting the present invention.

S306: the eNB receives the MBSFN subframe configurations of the respective neighboring cells as feedback.

In one embodiment of the present invention, the eNB receives the MBSFN subframe configurations of the respective neighboring cells feedback by X2 setup response messages. Particularly, the MBSFN subframe configurations may also be added into the serving cell information for sending.

S308: after receiving the MBSFN subframe configurations of all the neighboring cells, the eNB compares the MBSFN subframe configurations of respective neighboring cells with its MBSFN subframe configuration, and sets system information or RRC (radio resource control) connection reconfiguration information according to the comparison result. For example, NeighCellConfig information is correctly configured in a broadcasting message SIB3/SIB5 or RRC connection reconfiguration information. If the MBSFN subframe configuration of at least one neighboring cell is different from that of the eNB, then NeighCellConfig information is set as 00; if the MBSFN subframe configurations of all neighboring cells are the same as that of the eNB, then NeighCellConfig information is set as 10; if none of all neighboring cells feeds back the MBSFN subframe configuration, then NeighCellConfig information is set as 01.

In a preferable embodiment of the present invention, the eNB may make scheduling according to the MBSFN subframe configurations of respective neighboring cells. For example, after the eNB obtains the MBSFN subframe configurations of the neighboring cells, which may be the reconfigured MBSFN subframe configurations, the resource utilization is defined according to the configurations of respective cells. As the MBSFN subframe of the neighboring cells may cause relative strong interference with the current cell, it should try to avoid corresponding to the subframe of the current cell during the scheduling according to the obtained MBSFN subframe configuration of the neighboring cells. For example, supposed that the MBSFN subframe of the neighboring cell is set as 1, 3, 5, the subframe of the eNB should be preferably set as 2, 4, and 6 during the scheduling. When the subframe of the eNB has to be chosen from what the MBSFN subframe of the neighboring cell is set, a higher coding protection level should be used, e.g., ⅓ coding instead of ⅔ coding, or a lower scheduling level should be used, such as QPSK degraded from 16 jQAM. Moreover, the nearer UE is chosen for scheduling. For example, the eNB may determine which UE is nearer to the eNB according to reported RSRP or RSRQ from the UE.

In another embodiment of the present invention, when its MBSFN subframe configuration changes, the eNB may send its MBSFN subframe configuration to respective neighboring cells with an eNB X2 configuration update message to notify all neighboring cells of its new configuration.

The above embodiments of the interaction between the eNB and the neighboring cells are described as examples. In other embodiments of the present invention, however, the eNB may also communicate with RNs to which the eNB is connected for the same sending as the above embodiments. The MBSFN subframe configuration information is transmitted via X2 interface as follows:

```
MBSFN-SubframeConfig ( relay )  ::=  SEQUENCE {
radioframeAllocationPeriod  ENUMERATED {n1, n2, n4, n8, n16,
                              n32},
radioframeAllocationOffset  INTEGER (0..7),
subframeAllocation          CHOICE {
oneFrame                    BIT STRING (SIZE(6)),
fourFrames                  BIT STRING (SIZE(24))
}
```

Figure 4:
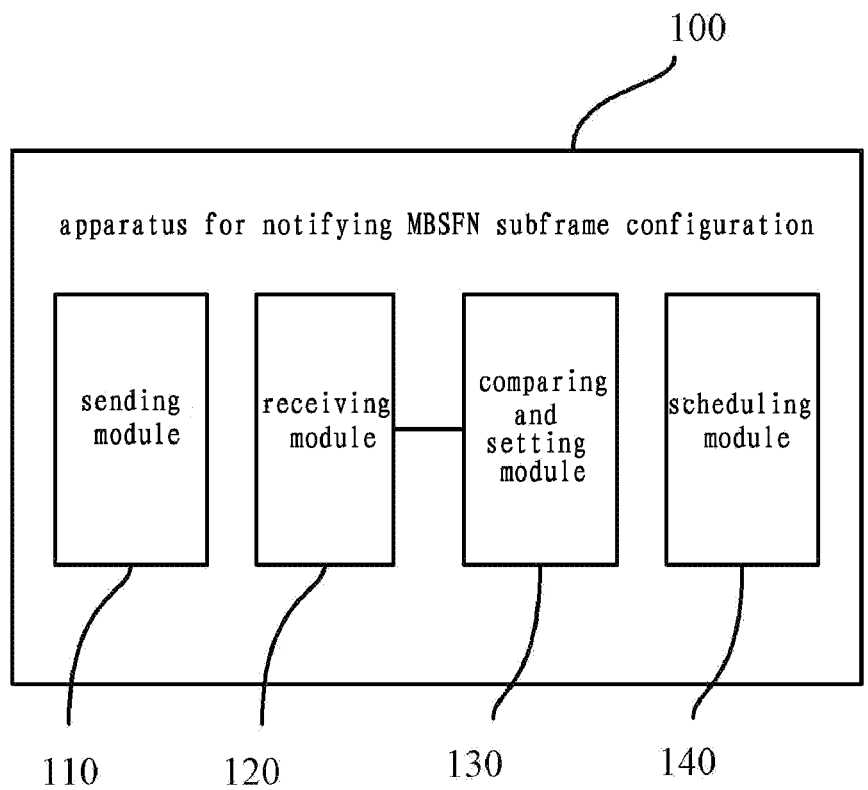
FIG. 4 is a schematic structural diagram showing an apparatus for notifying MBSFN subframe configurations according to an embodiment of the present invention.

FIG. 4 is a schematic structural diagram showing an apparatus for notifying MBSFN subframe configurations according to an embodiment of the present invention. The apparatus 100 for notifying the MBSFN subframe configuration comprises a sending module 110 and a receiving module 120, wherein the sending module 110 is configured for sending MBSFN subframe configuration of the first node, via an X2 interface, to the second nodes to which the first node is connected. The receiving module 120 is configured for receiving the MBSFN subframe configuration of the respective second nodes fed back by them.

In one embodiment of the present invention, when a cell is set up, the sending module 110 is configured for sending the MBSFN subframe configuration of the first node to respective neighboring cells and/or RNs with X2 setup request messages.

In one embodiment of the present invention, the receiving module 120 is configured for receiving the MBSFN subframe configurations of respective second nodes feedback by X2 setup response messages.

In one embodiment of the present invention, the apparatus 100 for notifying the MBSFN subframe configuration also comprises a comparing and setting module 130, which is configured for comparing the MBSFN subframe configurations of respective second nodes with the MBSFN subframe configuration of the first node, and setting system information or RRC connection reconfiguration information according to the comparison result.

In one embodiment of the present invention, the apparatus 100 for notifying the MBSFN subframe configuration also comprises a scheduling module 140, which is configured for making scheduling according to the MBSFN subframe configurations of respective second nodes.

In one embodiment of the present invention, the sending module 110 is also configured for sending the MBSFN subframe configuration of the first node to respective second nodes with X2 configuration update messages when the MBSFN subframe configuration of the first node changes.

The first node may be an eNB or a RN, and the second nodes may be neighboring eNBs or RNs.

Figure 5:
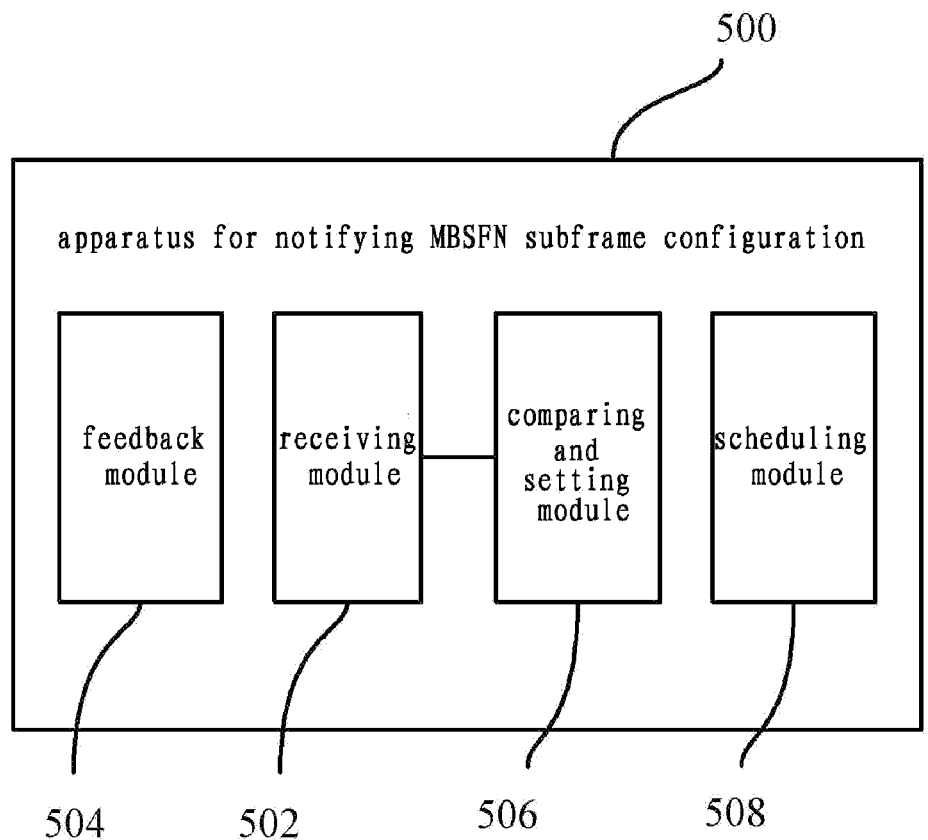
FIG. 5 is a schematic structural diagram showing an apparatus for notifying MBSFN subframe configurations according to an embodiment of the present invention.

FIG. 5 is a schematic structural diagram showing an apparatus for notifying MBSFN subframe configurations according to an embodiment of the present invention. As shown in FIG. 5, the apparatus 500 comprises a receiving module 502 and a feedback module 504. The receiving module 502 is configured for receiving the MBSFN subframe configurations from a plurality of first nodes. The feedback module 504 is configured for feeding the MBSFN subframe configuration of the second node back to respective first nodes.

The apparatus also comprises a comparing and setting module 506, which is configured for comparing the MBSFN subframe configuration of the second node with the MBSFN subframe configurations of the respective first nodes and setting system information or RRC connection reconfiguration information according to the comparison result.

The apparatus also comprises a scheduling module 508, which is configured for making scheduling according to the MBSFN subframe configurations of the respective first nodes.

When the MBSFN subframe configuration of the second node changes, the feedback module feeding the MBSFN subframe configuration of the second node back to respective first nodes via X2 interface comprises: the feedback module feeds the MBSFN subframe configuration of the second node back to the first node with a X2 configuration update message of the second node.

The first nodes may be eNBs or RNs, and the second node may be a neighboring eNB or RN.

According to the invention, a first node (such as a serving cell) can obtain the MBSFN subframe configuration of a second node (such as a neighboring cell and/or RN), while the second node can also obtain the MBSFN subframe configuration of the first node, so that rational utilization of resources is achieved according to the configurations. Therefore interference between cells is reduced, and system capacity and efficiency are improved.

Whereas the embodiments of the present invention have been shown and described, for a person skilled in the art, it should be understood that these embodiments can be subjected to various changes, modifications, replacements and deformations without departing from the principle and spirits of the present invention, and the scope of the present invention is limited by the appended claims and their equivalents.

What is claimed:

1. A method for notifying Multicast Broadcast Single Frequency Network (MBSFN) subframe configuration, comprising:
   a first node sending its MBSFN subframe configuration, via an X2 interface, to a plurality of second nodes to which the first node is connected, wherein the MBSFN subframe configuration of the first node includes X2 configuration update messages of the first node if the MBSFN subframe configuration of the first node changes;
   if the first node receives the MBSFN subframe configurations of the respective second nodes as feedback;
   the first node compares the MBSFN subframe configurations of the respective second nodes with the MBSFN subframe configuration of the first node, and sets system information or a radio resource control (RRC) connection reconfiguration information according to the comparison result, wherein the system information or the RRC connection reconfiguration information includes a first bit sequence, and the first bit sequence is set based on the outcome of the comparison result; and if the first node does not receive the feedback MBSFN subframe configurations of the respective second nodes, the first node sets the system information or the RRC connection reconfiguration information according to a second bit sequence different than the first bit sequence.

2. The method for notifying MBSFN subframe configuration of claim 1, wherein, when a cell is set up, the first node sending its MBSFN subframe configuration to the respective second nodes via an X2 interface comprises: the first node sending its MBSFN subframe configuration to the respective second nodes with one or more X2 setup request messages.

3. The method for notifying MBSFN subframe configuration of claim 1, wherein, the first node receiving the MBSFN subframe configurations of the respective second nodes as feedback comprises: the first node receiving the MBSFN subframe configurations of the respective second nodes feedback by one or more X2 setup response messages.

4. The method for notifying MBSFN subframe configuration of claim 3, further comprising: the first node making scheduling according to the MBSFN subframe configurations of the respective second nodes.

5. The method for notifying MBSFN subframe configuration of claim 1, wherein, after the second node receives the sent MBSFN subframe configuration of the first node, it further comprises: the second node comparing the MBSFN subframe configuration of the first node with the MBSFN subframe configurations of the second node, and setting system information or radio resource control RRC connection reconfiguration information according to the comparison result.

6. The method for notifying MBSFN subframe configuration of claim 5, further comprising: the second node making scheduling according to the MBSFN subframe configuration of the first node.

7. The method for notifying MBSFN subframe configuration of claim 1, wherein, when the MBSFN subframe configuration of the second node changes, the second node sending its MBSFN subframe configuration to the first node via the X2 interface comprises: the second nodes sending their MBSFN subframe configurations to the first node with X2 configuration update messages of the second nodes.

8. The method for notifying MBSFN subframe configuration of claim 1, wherein, the first node is an evolved Node B (eNB) or a relay node (RN), while the second nodes are the neighboring eNBs or RNs of the first node.

9. An apparatus for notifying Multicast Broadcast Single Frequency Network (MBSFN) subframe configuration, comprising an evolved Node B (eNB) configured for:
sending the MBSFN subframe configuration of a first node, via an X2 interface, to a plurality of second nodes, wherein the MBSFN subframe configuration of the first node includes X2 configuration update messages of the first node if the MBSFN subframe configuration of the first node changes;
receiving the MBSFN subframe configurations of the respective second nodes as feedback;
comparing the MBSFN subframe configurations of the respective second nodes with the MBSFN subframe configuration of the first node, and setting system information or a radio resource control (RRC) connection reconfiguration information according to the comparison result, wherein the system information or the RRC connection reconfiguration information includes a first bit sequence set based on the outcome of the comparison result, if the MBSFN subframe configuration of the second node is fed back to the respective first nodes; and
setting the system information or the RRC connection reconfiguration information according to a second bit sequence different than the first bit sequence, if the MBSFN subframe configuration of the respective second nodes is not fed back to the respective first nodes.

10. The apparatus of claim 9, wherein, when a cell is set up, the eNB is further configured for:
sending the MBSFN subframe configuration of the first node to the respective second nodes with one or more X2 setup request messages; and
receiving the MBSFN subframe configurations of the respective second nodes feedback by one or more X2 setup response messages.

11. The apparatus of claim 9, wherein the eNB is further configured for scheduling according to the MBSFN subframe configurations of the respective second nodes.

12. The apparatus of claim 9, wherein, the first node is an evolved Node B (eNB) or a relay node (RN), while the second node is the neighboring eNB or RN of the first node.

13. An apparatus for notifying Multicast Broadcast Single Frequency Network (MBSFN) subframe configuration, comprising an evolved Node B (eNB) configured for:
receiving the MBSFN subframe configurations from a plurality of first nodes;
feeding the MBSFN subframe configuration of a second node back to the respective first nodes, wherein the MBSFN subframe configuration of the second node includes X2 configuration update messages of the second node if the MBSFN subframe configuration of the second node changes;
comparing the MBSFN subframe configuration of the second node with the MBSFN subframe configurations of the respective first nodes, and setting system information or a radio resource control (RRC) connection reconfiguration information according to the comparison result, wherein the system information or the RRC connection reconfiguration information includes a first bit sequence set based on the outcome of the comparison result, if the MBSFN subframe configuration of the second node is fed back to the respective first nodes; and
setting the system information or the RRC connection reconfiguration information according to a second bit sequence different than the first bit sequence, if the MBSFN subframe configuration of the respective second nodes is not fed back to the respective first nodes.

14. The apparatus of claim 13, wherein the eNB is further configured for scheduling according to the MBSFN subframe configurations of the respective first nodes.

15. The apparatus of claim 13, wherein, the first nodes are evolved Node Bs (eNBs) or relay nodes (RNs), and the second node is a neighboring eNB or RN.

* * * * *